United States Patent
Punathil et al.

(10) Patent No.: US 11,074,095 B2
(45) Date of Patent: Jul. 27, 2021

(54) EVENT-BASED VIRTUAL MACHINE THAT HOSTS MICROSERVICES FOR HANDLING PROGRAM FAULTS

(71) Applicant: INTERNATIONAL BUSINESS MACHINES CORPORATION, Armonk, NY (US)

(72) Inventors: Gireesh Punathil, Kannur (IN); Deepthi Sebastian, Bangalore (IN); Vijayalakshmi Kannan, Bangalore (IN); Kabir Islam, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 280 days.

(21) Appl. No.: 16/240,157

(22) Filed: Jan. 4, 2019

(65) Prior Publication Data

US 2020/0218557 A1    Jul. 9, 2020

(51) Int. Cl.
*G06F 9/455* (2018.01)
*G06F 11/14* (2006.01)
*G06F 9/4401* (2018.01)

(52) U.S. Cl.
CPC ........ *G06F 9/45558* (2013.01); *G06F 9/4401* (2013.01); *G06F 11/1484* (2013.01);
(Continued)

(58) Field of Classification Search
None
See application file for complete search history.

(56) References Cited

U.S. PATENT DOCUMENTS

| | | | |
|---|---|---|---|
| 8,578,214 B2 | 11/2013 | Dufour et al. | |
| 8,639,984 B2 * | 1/2014 | McNeeney | G06F 11/1484 714/38.1 |

(Continued)

OTHER PUBLICATIONS

Unknown, "Improving microservice resilience in Liberty", IBM Knowledge Center, https://www.ibm.com/support/knowledgecenter/en/SSEQTP_liberty/com.ibm.websphere.wlp.doc/ae/twlp_microprofile_fault_tolerance.html, accessed on Mar. 9, 2021, 9 pages.

(Continued)

*Primary Examiner* — Bing Zhao
(74) *Attorney, Agent, or Firm* — Nicholas Bowman; Andrew D. Wright; Roberts Calderon Safran & Cole, P.C.

(57) ABSTRACT

Methods and systems for an event-based virtual machine that hosts microservices are disclosed. A method includes: booting, by a computing device, a virtual machine and storing a first process state of the virtual machine in response to completing the booting the virtual machine; initializing, by the computing device, components of the virtual machine and storing a second process state of the virtual machine in response to completing the initializing the components of the virtual machine; preparing, by the computing device, to start a transaction in the virtual machine and storing a third process state of the virtual machine in response to the preparing to start the transaction in the virtual machine; in response to determining that a fault has occurred in the virtual machine, the computing device selecting a stored process state of the virtual machine from the group consisting of the first process state, the second process state, and the third process state; and resetting, by the computing device, the virtual machine using the selected stored process state of the virtual machine.

11 Claims, 9 Drawing Sheets

(52) U.S. Cl.
CPC .............. *G06F 2009/45575* (2013.01); *G06F 2201/815* (2013.01)

(56) References Cited

U.S. PATENT DOCUMENTS

| | | |
|---|---|---|
| 9,081,597 B2 * | 7/2015 | Zaslavsky ............ G06F 11/1484 |
| 9,411,667 B2 | 8/2016 | Jayakumar et al. |
| 9,645,847 B1 * | 5/2017 | Roth ..................... G06F 9/4868 |
| 2009/0222815 A1 | 9/2009 | Dake |
| 2012/0066556 A1 | 3/2012 | Dufour et al. |
| 2013/0185586 A1 | 7/2013 | Vachharajani et al. |
| 2013/0332781 A1 | 12/2013 | Jayakumar et al. |
| 2017/0046146 A1 | 2/2017 | Jamjoom et al. |

OTHER PUBLICATIONS

Turner, "Robust Design Techniques for C Programs", http://freetype.sourceforge.net/david/reliable-c.html, accessed on Mar. 9, 2021, 22 pages.

* cited by examiner

| Fault Type \ Fault Source | JIT-compiled Application Code | JIT Compiler | Garbage Collector | VM Event Infrastructure | Runtime or Operating System |
|---|---|---|---|---|---|
| TypeError | Truncation | n/a | n/a | n/a | n/a |
| SyntaxError | Truncation | n/a | n/a | n/a | n/a |
| SocketException | Truncation | n/a | n/a | n/a | n/a |
| NullPointerException | Truncation | n/a | n/a | n/a | n/a |
| Stack Overflow | Abscission | Abscission | Abscission | Abscission | Abscission |
| Out of Memory | Abscission | Abscission | Abscission | Abscission | Abscission |
| SIGSEGV | Truncation | Cotyledon | Cotyledon | Cotyledon | Cotyledon |
| SIGILL | Truncation | Cotyledon | Cotyledon | Cotyledon | Cotyledon |
| SIGFPE | Truncation | Cotyledon | Cotyledon | Cotyledon | Cotyledon |

EVENT-BASED VIRTUAL MACHINE THAT HOSTS MICROSERVICES FOR HANDLING PROGRAM FAULTS

BACKGROUND

The present invention generally relates to computing devices and, more particularly, to methods and systems for an event-based virtual machine that hosts microservices.

Software applications built using conventional compiled programming languages (e.g., C and C++) have their source code compiled into machine code and run directly in the machine with little support from the runtime environment (limited to loading, linking, environment setup etc.). In such execution environments, process management is typically performed within the application itself (e.g., a large C application hosting a database server). Under abnormal program conditions such as a bad code (SIGILL)/bad data (SIGSEGV), execution is typically halted, because the state of the process (e.g., its resources and code logic) is dynamic and arbitrary from the runtime system's perspective, and dependencies between modules/threads are unknown and cannot be disentangled at such arbitrary control flow points. For example, the problematic code and/or code impacted by the problematic code may be loaded through a shared library at runtime (e.g., through "dlopen"), and the runtime system and/or application may not have any static insights about such code. Additionally, when an application exhibits abnormal program behavior, the state of a multitude of threads is arbitrary (e.g., at different points in the lifecycle).

Software applications built using interpreted programming languages (e.g., Java) are typically interpreted at runtime using an interpreter, which may reside within a virtual machine (e.g., a Java virtual machine). Interpreters typically dynamically compile code and use a managed heap and therefore maintain more control over processes as compared to the runtime environment for compiled programming languages.

SUMMARY

In a first aspect of the invention, there is a method that includes: booting, by a computing device, a virtual machine and storing a first process state of the virtual machine in response to completing the booting the virtual machine; initializing, by the computing device, components of the virtual machine and storing a second process state of the virtual machine in response to completing the initializing the components of the virtual machine; preparing, by the computing device, to start a transaction in the virtual machine and storing a third process state of the virtual machine in response to the preparing to start the transaction in the virtual machine; in response to determining that a fault has occurred in the virtual machine, the computing device selecting a stored process state of the virtual machine from the group consisting of the first process state, the second process state, and the third process state; and resetting, by the computing device, the virtual machine using the selected stored process state of the virtual machine.

In another aspect of the invention, there is a computer program product that includes a computer readable storage medium having program instructions embodied therewith. The program instructions are executable by a computing device to cause the computing device to: boot a virtual machine and store a first process state of the virtual machine in response to completing the booting the virtual machine; initialize components of the virtual machine and store a second process state of the virtual machine in response to completing the initializing the components of the virtual machine; prepare to start a transaction in the virtual machine and store a third process state of the virtual machine in response to the preparing to start the transaction in the virtual machine; in response to determining that a fault has occurred in the virtual machine, select a stored process state of the virtual machine from the group consisting of the first process state, the second process state, and the third process state; and reset the virtual machine using the selected stored process state of the virtual machine.

In another aspect of the invention, there is a system that includes: a hardware processor, a computer readable memory, and a computer readable storage medium associated with a computing device; program instructions configured to boot a virtual machine and store a first process state of the virtual machine in response to completing the booting the virtual machine; program instructions configured to initialize components of the virtual machine and store a second process state of the virtual machine in response to completing the initializing the components of the virtual machine; program instructions configured to prepare to start a transaction in the virtual machine and store a third process state of the virtual machine in response to the preparing to start the transaction in the virtual machine; program instructions configured to, in response to determining that a fault has occurred in the virtual machine, select a stored process state of the virtual machine from the group consisting of the first process state, the second process state, and the third process state; and program instructions configured to reset the virtual machine using the selected stored process state of the virtual machine, wherein the program instructions are stored on the computer readable storage medium for execution by the hardware processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to computing devices and, more particularly, to methods and systems for an event-based virtual machine that hosts microservices. As described herein, aspects of the invention include a method and system for a single-threaded event-driven virtual machine that handles program faults by identifying the fault type, identifying the fault source, determining a recovery stage based upon the fault type and the fault source, and performing recovery operations by entering the determined recovery stage.

In the case of interpreted programming languages, fault recovery in the case of a multi-threaded application is also problematic due to dynamism and arbitrariness, as discussed above with respect to compiled programming languages. Additionally, in the case of general-purpose applications that contain tasks with heterogeneous lifecycles, isolation of one transaction from another is difficult. In an example, a Java application hosting a web server may have several threads executing individual transactions/batch jobs, and at the time of a program fault, each thread may be at a different stage in its lifecycle, irrespective of the lifecycle stages of the other threads in terms of execution flow. Accordingly, conventional virtual machines (language runtimes) that execute interpreted programming languages typically terminate a process under unexpected program situations. Some languages runtimes providing traces and dumps at the termination site for postmortem debugging and problem determination.

The termination of processes under unexpected program situations that occurs in conventional virtual machines is problematic for business-critical applications that require a high level of availability, both in terms of the application being available for consumption during a specific duration of time and in terms of a transaction request drop percentage. Aspects of the invention address this problem by providing methods and systems for managing program faults in a single-threaded, event-driven virtual machine in an efficient manner, and thereby maximizing reliability and availability of business-critical applications while ensuring that program correctness and transactional integrity constraints are not violated.

Accordingly, embodiments improve the functioning of a computer by providing methods and systems for an event-based virtual machine that hosts microservices. In particular, embodiments improve software by providing an improved single-threaded event-driven virtual machine that handles program faults by identifying the fault type, identifying the fault source, determining a recovery stage based upon the fault type and the fault source, and performing recovery operations by entering the determined recovery stage. These software improvements provide an improved virtual machine (language runtime) that maximizes reliability and availability of business-critical applications while ensuring that program correctness and transactional integrity constraints are not violated. Additionally, implementations of the invention use techniques that are, by definition, rooted in computer technology (e.g., virtual machines and language runtimes).

Aspects of the invention improve a single-threaded event-driven virtual machine (such as node.js) by: (1) intercepting program faults such as bad input, illegal code semantics, unexpected machine traps, etc.; (2) localizing the scope of the anomaly within the application code or any of the virtual machine components; (3) applying a pre-defined logic and identifying the implications of the anomaly for (i) the transaction that caused the anomaly, (ii) the transactions that are currently under process, (iii) the transactions that are in the server's backlog, and (iv) the virtual machine's stability itself; and (4) taking appropriate mitigation actions (based on the identified implications) for the sustenance of the virtual machine such as: (i) aborting the failing transaction and resetting the application to a predefined control flow point called the "truncation stage" and continuing with the rest of the transactions which are under progress, (ii) aborting all transactions that are currently under progress and resetting the application to a predefined control flow point called the "abscission stage" and continuing with the transactions in the backlog that are not yet started, and (iii) aborting all the transactions including the ones in the backlog, reinitializing the virtual machine's auxiliary components and their data structures and resetting the virtual machine to a control flow point called the "cotyledon stage" and starting listening for fresh connections.

Microservices are proliferating in distributed computing systems (e.g., cloud computing) and typically provide improved modularity, isolation, scalability, problem determination, monitoring and metering. Microservices typically expose fine-grained and streamlined interfaces. Accordingly, the tasks carried out by microservices (e.g., mini transactions that are part of a larger application composition that invoked this microservice) are typically highly transactional and predominantly homogeneous. In an example, a microservice exposing a REST API to access backend data starts with a client request, parses the request, accesses the data record, performs an optional transformation to the data, and ends with a response back to the caller. In this example, the lifecycle points of the nth and n+1th transactions are typically the same, with only the input data and the output data differing, and therefore the task is homogeneous.

Aspects of the invention leverage these insights on the characteristic traits of microservices and provide methods and systems that improve the reliability and availability of applications hosted in single-threaded event-driven virtual machines and manage transactions in a more sophisticated manner. Other aspects of the invention provide an improved virtual machine for other applications that follow a well-defined transactional life cycle.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
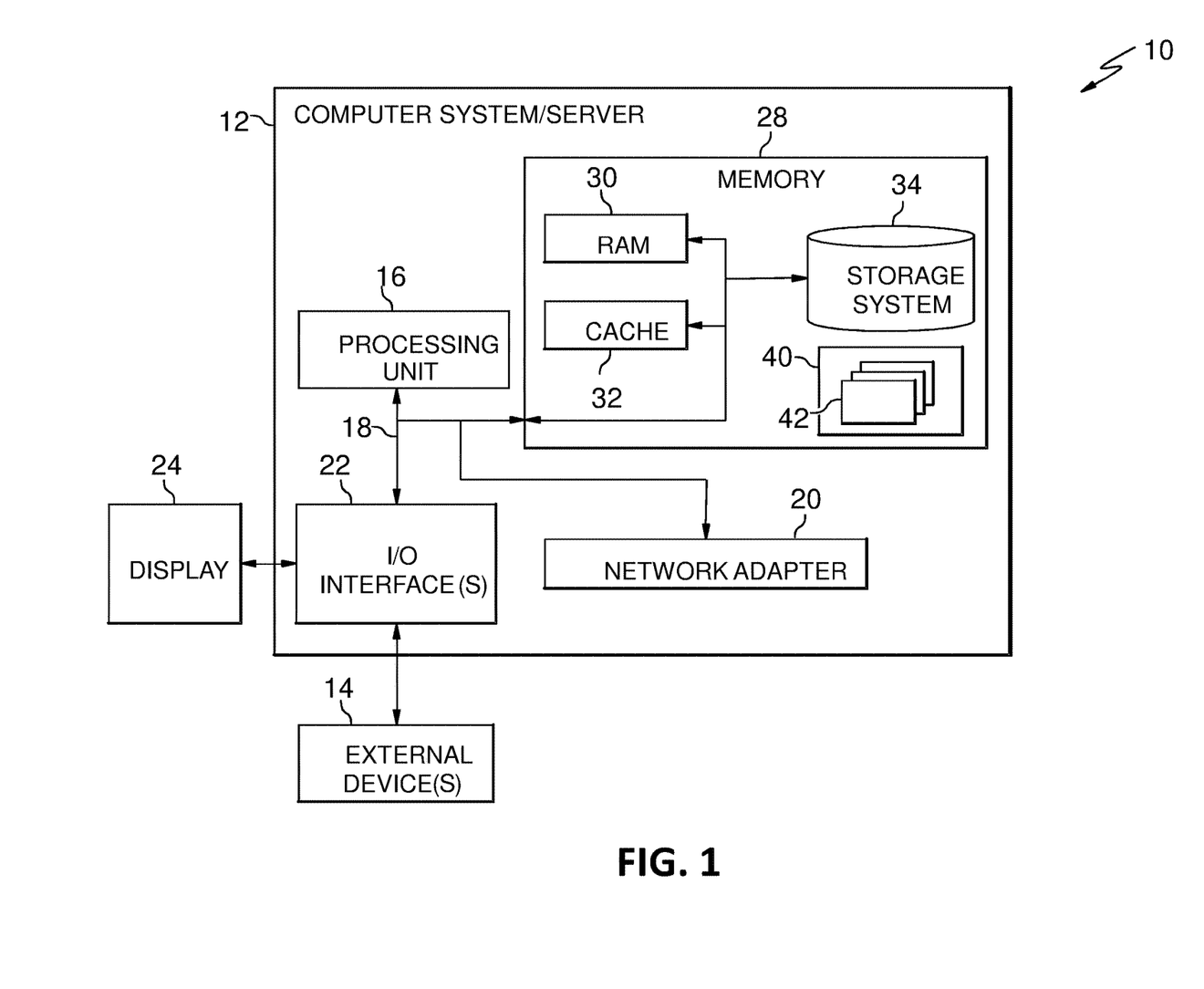
FIG. 1 depicts a computer system in accordance with aspects of the invention.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
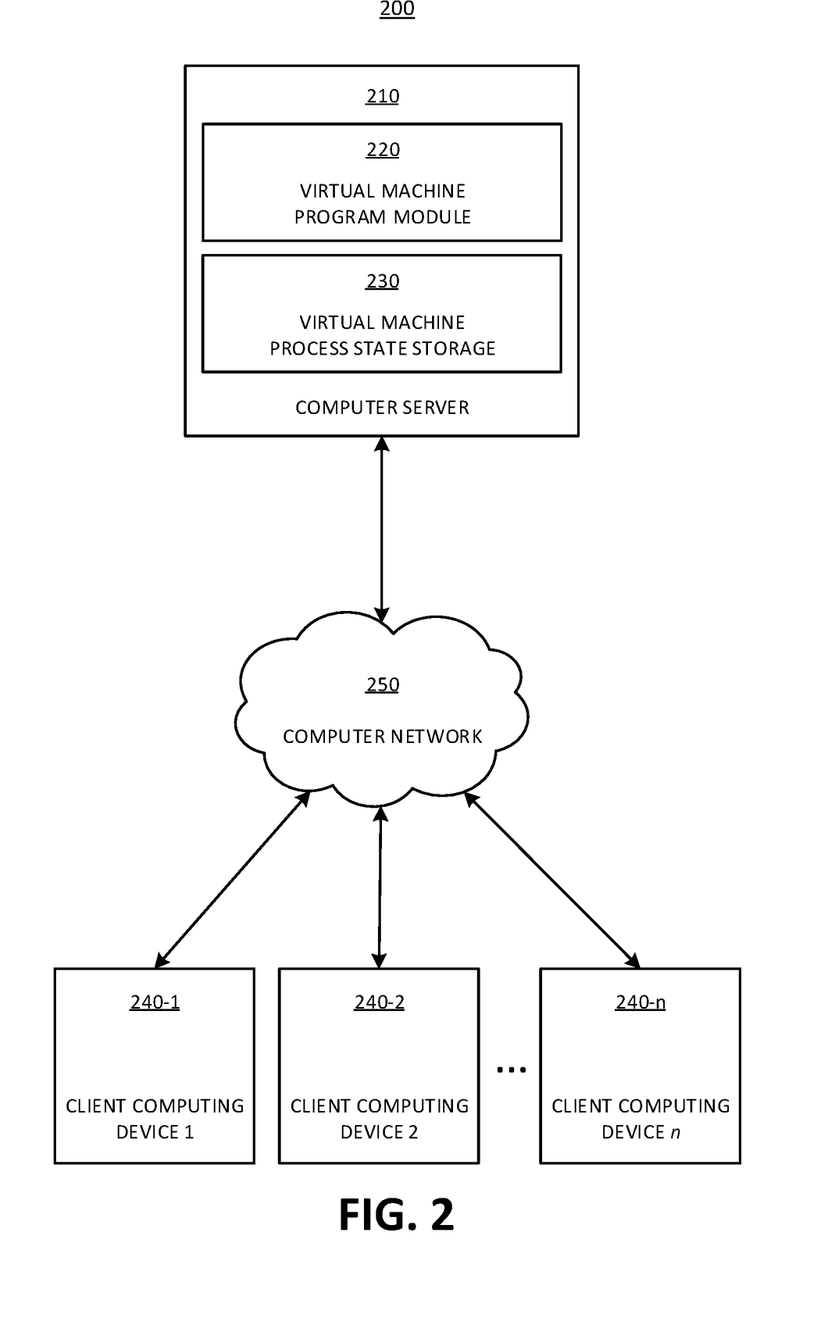
FIG. 2 depicts an illustrative environment in accordance with aspects of the invention.

FIG. 2 depicts an illustrative environment 200 in accordance with aspects of the invention. As shown, the environment 200 comprises a computer server 210 and a plurality of client computing devices 240-1, 240-2, . . . , 240-n which are in communication via a computer network 250. In embodiments, the computer network 250 is any suitable network including any combination of a LAN, WAN, or the Internet. In embodiments, the computer server 210 and the client computing devices 240-1, 240-2, . . . , 240-n are physically collocated, or, more typically, are situated in separate physical locations.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices of the environment 200 may perform one or more functions described as being performed by another one or more of the devices of the environment 200.

In embodiments, the computer server 210 is a computer device comprising one or more elements of the computer system/server 12 (as shown in FIG. 1). In particular, the computer server 210 is implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, the computer server 210 includes a virtual machine program module 220, which includes hardware and/or software and is one or more of the program modules 42 shown in FIG. 1. The virtual machine program module 220 includes program instructions for a virtual machine (language runtime). In embodiments, the program instructions included in the virtual machine program module 220 of the computer server 210 are executed by one or more hardware processors.

In particular, in embodiments, the virtual machine program module 220 runs (implements) a single-threaded event-driven web program such as a microservice that receives requests from and provides responses to a plurality of clients, such as the client computing devices 240-1, 240-2, . . . , 240-n. In an example, a microservice running on the virtual machine program module 220 may have multiple pending client requests, including client requests that are being responded to, client requests that have been parsed but not yet responded to, and client requests under a listen backlog (e.g., waiting for a service listener to accept the connection).

In embodiments, programs running on the virtual machine program module 220 have well-defined lifecycle milestones for the transactions they carry. In particular, each transaction starts with a request from one of the client computing devices 240-1, 240-2, . . . , 240-n being intercepted in a listening socket. A client request callback in the program handles the received request. While the program may run arbitrary server code, every action pertinent to the transaction is either confined to this callback or emanates from this callback in the form of new events and event listeners. From the client request object, all artifacts (e.g., transaction objects, events, and their listeners) may be traced and reached. Finally, each transaction ends when the server response is closed.

In embodiments, in programs running on the virtual machine program module 220, isolation of the transactions under process from those which are pending is possible. In particular, the transaction pertinent to the active client request object is the currently executing transaction, the rest of the transactions pertinent to the active client request objects are the active transactions, and the requests which are queued in the listener backlog are the pending transactions.

In embodiments, three milestones are defined with respect to the virtual machine program module 220. A first milestone is hereinafter referred to as a "truncation stage." The truncation stage is a stage in the operation of the virtual machine program module 220 at which a transaction is about to start. The state variables (e.g., the execution context and the stack frame variables at the start of the current transaction, the event that triggered the transaction, its associated native handles, and the event listeners) that represent the program state at the beginning of the transaction are recorded and saved into a globally accessible data structure (e.g., the virtual machine process state storage 230) for future use. Upon the occurrence of a fault in a program running on the virtual machine program module 220, these state variables pertinent to the failed transaction are extracted from the globally accessible data structure (e.g., the virtual machine process state storage 230) for automatic transaction readjustment, as described below. Each active transaction will have an associated truncation stage.

In embodiments, a second milestone in the virtual machine program module 220 is hereinafter referred to as an "abscission stage." The abscission stage is a process-wide stage in the operation of the virtual machine program module 220 at which no transactions have started. The state variables (e.g., the execution context and the stack frame variables at the start of the first transaction) that represent the program state at the beginning of the first transaction are recorded and saved into a globally accessible data structure (e.g., the virtual machine process state storage 230) for future use. Upon the occurrence of a fault in a program running on the virtual machine program module 220 that requires a reset to the abscission stage, these state variables are extracted from the globally accessible data structure (e.g., the virtual machine process state storage 230) for cleaning up resources and resetting the program state.

In embodiments, a third milestone in the virtual machine program module 220 is hereinafter referred to as a "cotyledon stage." The cotyledon stage is a stage in the operation of the virtual machine program module 220 at which components of the virtual machine such as a dynamic compiler, a garbage collector, event infrastructure, etc. are not yet initialized.

In embodiments, the virtual machine program module 220 implements a fault handling subroutine hereinafter referred to as a "reviver subroutine." The reviver subroutine is the fault handler which is registered in the virtual machine program module 220 during a boot sequence of the virtual machine program module 220. The reviver subroutine is invoked by the virtual machine program module 220 when the virtual machine program module 220 encounters a fault.

Still referring to FIG. 2, in embodiments, the computer server 210 also includes a virtual machine process state storage 230. According to an embodiment, the virtual machine process state storage 230 is used by the virtual machine program module 220 to store globally accessible data structures that include process state information. In embodiments, the virtual machine process state storage 230 is implemented as hardware and/or software using components such as storage devices. In other embodiments, the virtual machine process state storage 230 may be a storage device that is external to but accessible by the computer server 210.

Still referring to FIG. 2, in embodiments, each of the client computing devices **240-1, 240-2, . . . , 240-*n* is a computer device comprising one or more elements of the computer system/server 12 (as shown in FIG. 1). In embodiments, each of the client computing devices 240-1, 240-2, . . . , 240-*n* sends requests to and receives responses from a microservice running on the virtual machine program module 220 on the computer server 210. In particular, each of the client computing devices 240-1, 240-2, . . . , 240-*n* is implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients. In other embodiments, each of the client computing devices 240-1, 240-2, . . . , 240-*n*** is a desktop computer, a laptop computer, a mobile device such as a cellular phone, tablet, personal digital assistant (PDA), or other computing device.

Figure 3:
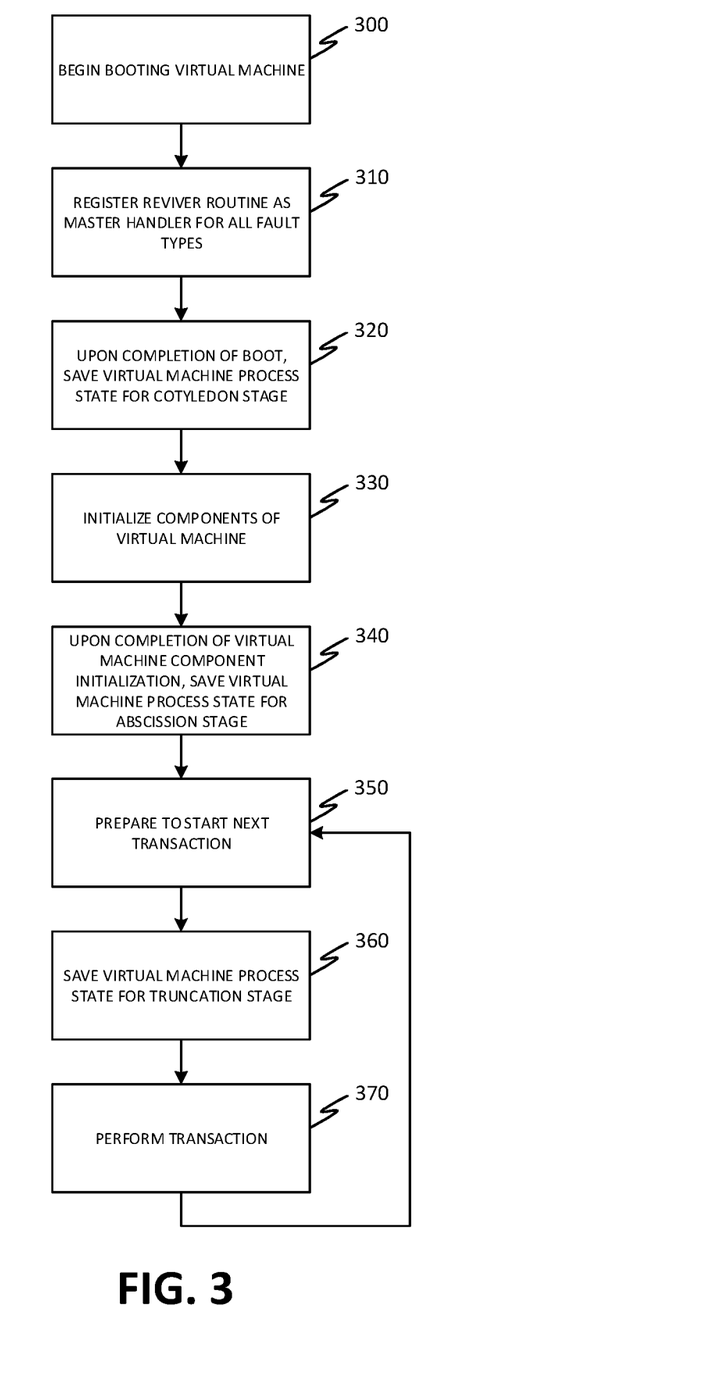
FIGS. 3 and 4 depict flowcharts of exemplary methods performed in accordance with aspects of the invention.

FIG. 3 depicts a flowchart of an exemplary method performed by the virtual machine program module 220 of the computer server 210 in accordance with aspects of the invention. The steps of the method are performed in the environment of FIG. 2 and are described with reference to the elements shown in FIG. 2.

At step 300, the computer server 210 begins booting a virtual machine. In embodiments, the computer server 210 begins booting the virtual machine program module 220 in response to a request to run a single-threaded event-driven program such as a microservice.

At step 310, the computer server 210 registers the reviver routine as the master handler for all fault types. In embodiments, the virtual machine program module 220 registers the reviver routine of FIG. 4, described below, as the master handler for all fault types that are encountered by the virtual machine program module 220, including faults encountered while running the single-threaded event-driven program.

At step 320, the computer server 210, upon completion of boot, saves a virtual machine process state for the cotyledon stage. In embodiments, when the virtual machine program module 220 finishes booting up (but prior to initializing its components), the virtual machine program module 220 saves its process state for the cotyledon stage into the virtual machine process state storage 230. The process state for the cotyledon stage saved into the virtual machine process state storage 230 includes data pertinent to initialized standard streams, handlers associated with signals, command line arguments, and environment variables that are parsed by the virtual machine program module 220.

At step 330, the computer server 210 initializes components of the virtual machine. In embodiments, the virtual machine program module 220 initializes components of the virtual machine program module 220 including a dynamic compiler, a garbage collector, and an event infrastructure.

At step 340, the computer server 210, upon completion of virtual machine component initialization, saves a virtual machine process state for the abscission stage. In embodiments, when the virtual machine program module 220 completes initialization of its components (including the dynamic compiler, the garbage collector, and the event infrastructure) but prior to starting a first transaction, the virtual machine program module 220 saves its process state for the abscission stage into the virtual machine process state storage 230. The process state for the abscission stage saved into the virtual machine process state storage 230 includes data pertinent to the execution context and stack frame variables at the start of the first transaction.

At step 350, the computer server 210 prepares to start the next transaction. In embodiments, the virtual machine program module 220 prepares to start a transaction in response to receiving a request from one of the client computing devices 240-1, 240-2, . . . , 240-*n*.

At step 360, the computer server 210 saves a virtual machine process state for the truncation stage. In embodiments, immediately prior to starting a transaction, the virtual machine program module 220 saves its process state for the truncation stage into the virtual machine process state storage 230. The process state for the truncation stage saved into the virtual machine process state storage 230 includes data pertinent to the execution context and the stack frame variables at the start of the current transaction, information identifying the event that triggered the transaction, information about associated native handles, and information about event listeners.

At step 370, the computer server 210 performs the transaction. In embodiments, the virtual machine program module 220 performs the transaction in response to receiving the request from one of the client computing devices 240-1, 240-2, . . . , 240-*n* and sends a response including a transaction result to the one of the client computing devices 240-1, 240-2, . . . , 240-*n* that sent the request. The flow then returns to step 350.

Figure 4:
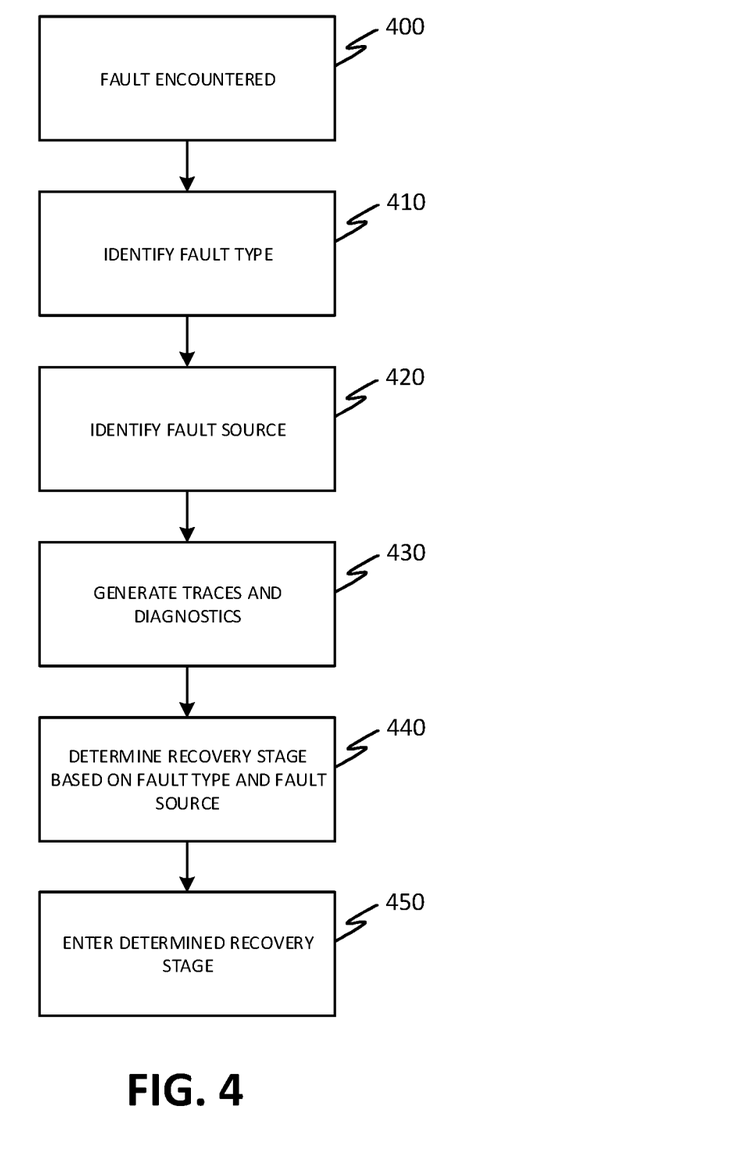

FIG. 4 depicts a flowchart of an exemplary reviver routine performed by the virtual machine program module 220 in response to any faults encountered by the virtual machine program module 220, including faults encountered while performing any of the steps included in the method of FIG. 3, in accordance with aspects of the invention. The steps of the method are performed in the environment of FIG. 2 and are described with reference to the elements shown in FIG. 2.

At step 400, the computer server 210 encounters a fault. In embodiments, the virtual machine program module 220 encounters a fault that is not handled by the single-threaded event-driven program that is running on the virtual machine program module 220. In response to encountering the fault, the virtual machine program module 220 saves the error context and passes control to the reviver routine.

At step 410, the computer server 210 identifies the fault type. In embodiments, the virtual machine program module 220 parses the error to identify the fault type. The fault types identified at step 410 include but are not limited to a runtime program fault (e.g., SyntaxError), a runtime resource fault (e.g., a remote endpoint connectivity failure), a predictable virtual machine fault (e.g., stack overflow, out of memory, etc.), and an unpredictable virtual machine, runtime, or operating system fault (e.g., SIGSEGV/SIGILL/SIGFPE).

At step 420, the computer server 210 identifies the fault source. In embodiments, the virtual machine program module 220 parses the error to identify the fault source. The fault sources identified at step 420 include but are not limited to the Just-In-Time compiled code of the application (JIT); virtual machine components such as the compiler, the garbage collector, the event infrastructure, etc.; and the runtime system libraries and operating system.

At step 430, the computer server 210 generates traces and diagnostics. In embodiments, the virtual machine program module 220 invokes routines that are responsible for writing the traces and dumps as prescribed in a default configuration of the computer server 210.

Figure 5:
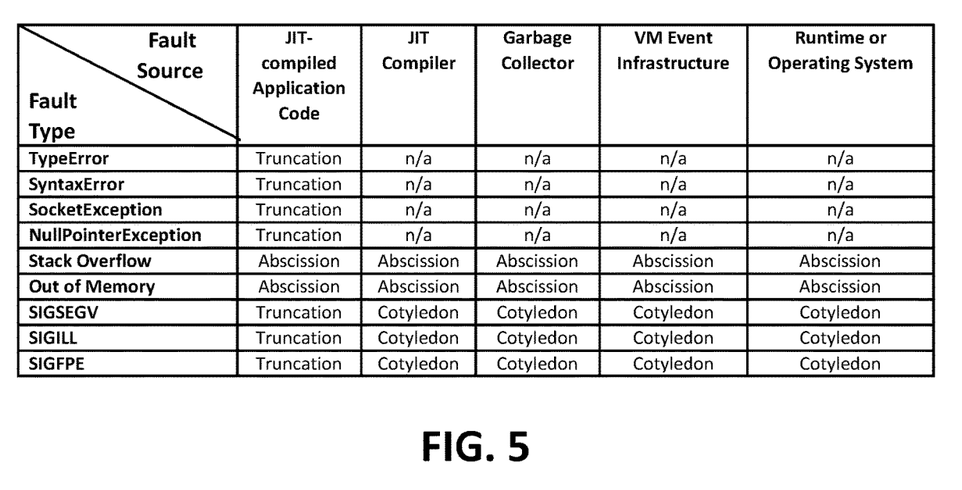
FIG. 5 depicts a table of predetermined recovery stages in accordance with aspects of the invention.

At step 440, the computer server 210 determines a recovery stage based on the fault type and the fault source. In embodiments, the recovery stage is predetermined for each combination of a fault type and a fault source, as shown in FIG. 5.

In particular, at step 440, the virtual machine program module 220 determines that the recovery stage is the truncation stage if the fault type identified at step 410 is any of the application-defined exceptions (e.g., TypeError, SyntaxError, SocketException, etc.) and the fault source identified at step 420 is the JIT-complied application code (e.g., web application code, third-party libraries, core APIs, etc.).

Additionally, at step 440, the virtual machine program module 220 determines that the recovery stage is the abscission stage if the fault type identified at step 410 is stack overflow or out of memory, for any fault source identified at step 420.

Additionally, at step 440, the virtual machine program module 220 determines that the recovery stage is the truncation stage if the fault type identified at step 410 is any of the machine traps (e.g., SIGSEGV, SIGILL, SIGFPE, etc.) and the fault source identified at step 420 is the JIT-complied application code (e.g., web application code, third-party libraries, core APIs, etc.). In the event that the machine trap is caused by a bad code (e.g., SIGILL/bad branch), then the virtual machine program module 220 invalidates and cleans up the JIT-compiled application code pertinent to problematic method and/or code impacted by the problematic method to avoid recurrence of the error.

Finally, at step 440, the virtual machine program module 220 determines that the recovery stage is the cotyledon stage if the fault type identified at step 410 is any of the machine traps (e.g., SIGSEGV, SIGILL, SIGFPE, etc.) and the fault source identified at step 420 is the virtual machine (e.g., JIT compiler, garbage collector, virtual machine event infrastructure, etc.), the runtime libraries, or the operating system.

At step 450, the computer server 210 enters the determined recovery stage. In embodiments, the virtual machine program module 220 enters the recovery stage (i.e., the truncation stage, abscission stage, or cotyledon stage) determined at step 440. In particular, if the recovery stage determined at step 440 is the truncation stage, then the virtual machine program module 220 enters the truncation stage by performing the steps of FIG. 6, as described below. If the recovery stage determined at step 440 is the abscission stage, then the virtual machine program module 220 enters the abscission stage by performing the steps of FIG. 7, as described below. Finally, if the recovery stage determined at step 440 is the cotyledon stage, then the virtual machine program module 220 enters the cotyledon stage by performing the steps of FIG. 8, as described below.

Figure 6:
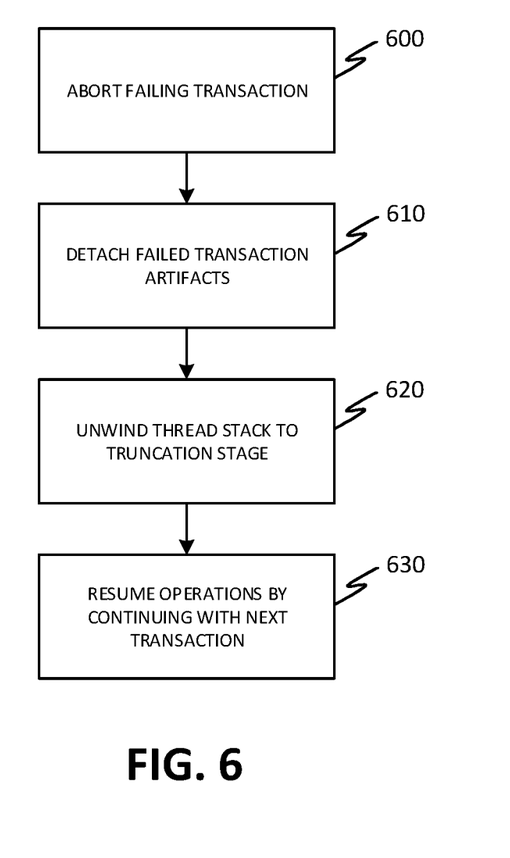
FIGS. 6, 7, and 8 depict flowcharts of exemplary methods performed in accordance with aspects of the invention.

FIG. 6 depicts a flowchart of an exemplary truncation stage recovery routine performed by the virtual machine program module 220 in response to the virtual machine program module 220 entering the truncation stage at step 450 (of FIG. 4), in accordance with aspects of the invention. The steps of the method are performed in the environment of FIG. 2 and are described with reference to the elements shown in FIG. 2.

At step 600, the computer server 210 aborts the failing transaction. In embodiments, the virtual machine program module 220 aborts the failing transaction.

At step 610, the computer server 210 detaches the failed transaction artifacts. In embodiments, the virtual machine program module 220 detaches events from event listeners and cleans up any native resources associated with the failing transaction (including both the problematic transaction and transactions impacted by the problematic transaction). The virtual machine program module 220 cleans up objects which were part of the transaction in the next garbage collection cycle as they are no longer reachable.

At step 620, the computer server 210 unwinds the thread stack to the truncation stage. In embodiments, the virtual machine program module 220 unwinds the thread stack to the stack frame pertinent to the truncation stage, based the process state saved by the virtual machine program module 220 at step 360 into the virtual machine process state storage 230.

At step 630, the computer server 210 resumes operations by continuing with the next transaction. In embodiments, the virtual machine program module 220 concludes the truncation stage recovery routine and returns to step 350 of FIG. 3, thereby continuing with the next transaction.

Figure 7:
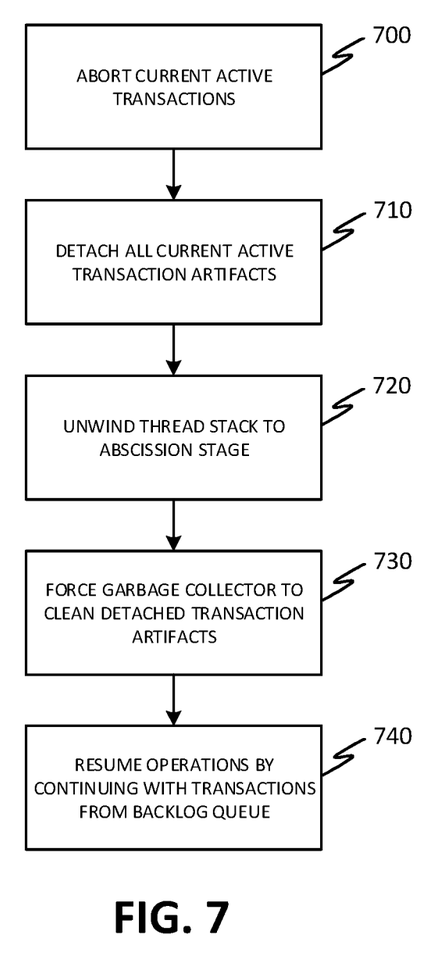

FIG. 7 depicts a flowchart of an exemplary abscission stage recovery routine performed by the virtual machine program module 220 in response to the virtual machine program module 220 entering the abscission stage at step 450 (of FIG. 4), in accordance with aspects of the invention. The steps of the method are performed in the environment of FIG. 2 and are described with reference to the elements shown in FIG. 2.

At step 700, the computer server 210 aborts the current active transactions. In embodiments, the virtual machine program module 220 aborts all of the current active transactions. In particular, the virtual machine program module 220 iterates through a work queue to identify all active transactions to be aborted.

In embodiments, all active transactions are aborted because the fault types triggering the abscission stage recovery routine of FIG. 7 (e.g., stack overflow or out of memory) are symptoms of collective utilization of runtime resources (e.g., stack memory or heap memory) by a plurality of transactions, and not by an individual one (i.e., the transaction that faced the issue is most likely not the one which caused the issue). Accordingly, the virtual machine program module 220 mitigates the fault by clearing all the active transactions that would have directly or indirectly contributed to the issue (but not the transactions in the backlog as they have not yet participated in resource consumption).

At step 710, the computer server 210 detaches all of the current active transaction artifacts. In embodiments, the virtual machine program module 220 clears each of the events, native handlers, and associated event handlers associated with all of the current transactions.

At step 720, the computer server 210 unwinds the thread stack to the abscission stage. In embodiments, the virtual machine program module 220 unwinds the thread stack to the stack frame pertinent to the abscission stage, based the process state saved by the virtual machine program module 220 at step 340 into the virtual machine process state storage 230.

At step 730, the computer server 210 forces the garbage collector to clean the detached transaction artifacts. In embodiments, the virtual machine program module 220 forces the garbage collector to clean up the memory pertinent to the aborted transactions.

At step 740, the computer server 210 resumes operations by continuing with transactions from the backlog queue. In embodiments, the virtual machine program module 220 concludes the abscission stage recovery routine and returns to step 350 of FIG. 3, thereby continuing with the next transaction from the backlog queue.

Figure 8:
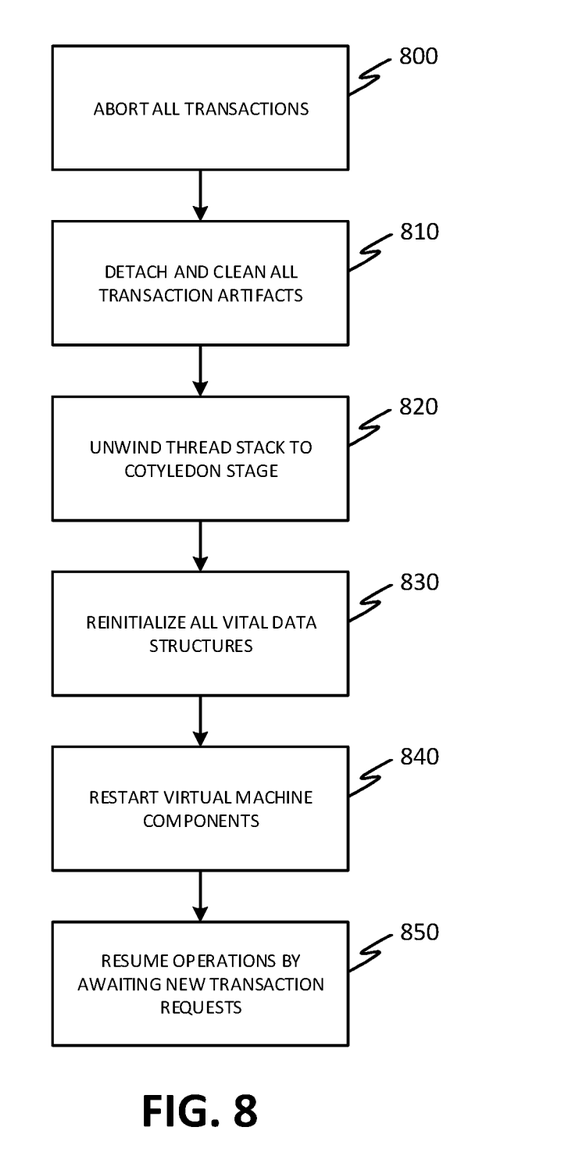

FIG. 8 depicts a flowchart of an exemplary cotyledon stage recovery routine performed by the virtual machine program module 220 in response to the virtual machine program module 220 entering the cotyledon stage at step 450 (of FIG. 4), in accordance with aspects of the invention. The steps of the method are performed in the environment of FIG. 2 and are described with reference to the elements shown in FIG. 2.

At step 800, the computer server 210 aborts all of the transactions. In embodiments, the virtual machine program module 220 aborts all of the current active transactions and all of the transactions in the backlog queue. In particular, the virtual machine program module 220 iterates through a work queue and a listen backlog queue to identify all transactions to be aborted.

At step 810, the computer server 210 detaches and cleans all of the transaction artifacts. In embodiments, the virtual machine program module 220 clears each of the events, native handlers, and associated event handlers for all of the transactions. Additionally, the virtual machine program module 220 clears all of the transactions in the work queue.

At step 820, the computer server 210 unwinds the thread stack to the cotyledon stage. In embodiments, the virtual machine program module 220 unwinds the thread stack to the stack frame pertinent to the cotyledon stage, based the process state saved by the virtual machine program module 220 at step 320 into the virtual machine process state storage 230.

At step 830, the computer server 210 reinitializes all of the vital data structures. In embodiments, the virtual machine program module 220 reinitializes all of the vital data structures based the process state saved by the virtual machine program module 220 at step 320 into the virtual machine process state storage 230.

At step 840, the computer server 210 restarts virtual machine components. In embodiments, the virtual machine program module 220 restarts virtual machine auxiliary modules including the compiler, the garbage collector, and the event infrastructure based the process state saved by the virtual machine program module 220 at step 320 into the virtual machine process state storage 230.

At step 850, the computer server 210 resumes operations by awaiting new transaction requests. In embodiments, the virtual machine program module 220 concludes the cotyledon stage recovery routine and returns to step 350 of FIG. 3, thereby awaiting a new transaction request.

Figure 9:
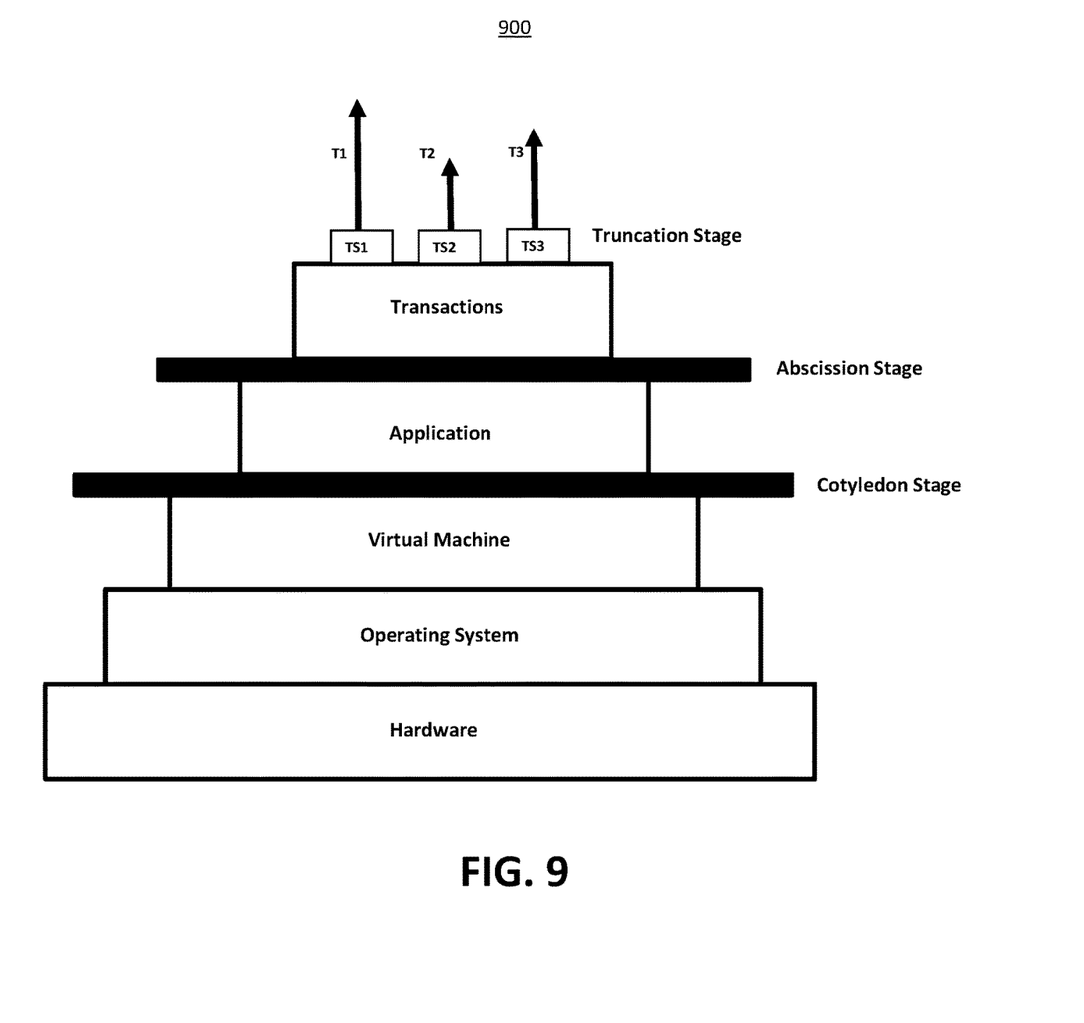
FIG. 9 depicts a block diagram illustrating recovery stages in accordance with aspects of the invention.

FIG. 9 depicts a block diagram 900 illustrating recovery stages in accordance with aspects of the invention. As illustrated in FIG. 9, the truncation stage recovery routine performed by the virtual machine program module 220 in response to the virtual machine program module 220 entering the truncation stage at step 450 affects (i.e., terminates) only a failing transaction. The abscission stage recovery routine performed by the virtual machine program module 220 in response to the virtual machine program module 220 entering the abscission stage at step 450 affects (i.e., terminates) all active transactions. The cotyledon stage recovery routine performed by the virtual machine program module 220 in response to the virtual machine program module 220 entering the cotyledon stage at step 450 affects (i.e., terminates) an application, including both active and pending transactions.

In other embodiments, a history of an anomaly (e.g., a location of a fault source, a fault type, a frequency of occurrence of the fault at the location with the fault type, a level of JIT optimization of the failing code, etc.) is recorded by the virtual machine program module 220. The virtual machine program module 220 then uses the history to de-optimize the failing method to a lower level based on a predefined condition (e.g., the problematic method or a method affected by the problematic method is found to be repeatedly failing at a specific program control point with a specific fault type and compiled with a specific compiler optimization level, wherein the repeat count is statically defined as a heuristic or derived through empirical evidence).

In other embodiments, a history of the anomaly (a location of the fault source, a fault type, a frequency of occurrence of the fault at the location with the fault type, a number of transactions successfully carried out between the samples taken, etc.) is recorded by the virtual machine program module 220. The virtual machine program module 220 then uses the history to take actions such as permanently shutting down the virtual machine with sufficient traces and dumps based on a predefined condition (e.g., the problematic method or a method affected by the problematic method is found to be the code that belongs to the virtual machine/runtime system/operating system and there are no transactions carried out between the samples taken and a predefined number of samples have been taken and analyzed, wherein the number of samples can de statically defined as a heuristic). This avoids the application endlessly crashing and resurrecting in a tight loop without carrying out any meaningful work.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

booting, by a computing device, a virtual machine and storing a first process state of a cotyledon stage of the virtual machine in response to completing the booting the virtual machine;

initializing, by the computing device, components of the virtual machine and storing a second process state of an abscission stage of the virtual machine in response to completing the initializing the components of the virtual machine;

preparing, by the computing device, to start a transaction in the virtual machine and storing a third process state of a truncation stage of the virtual machine in response to the preparing to start the transaction in the virtual machine, wherein the transaction is an instruction executed in the virtual machine;

in response to determining that a fault has occurred in the virtual machine, determining, by the computing device, a recovery stage for the virtual machine from the group consisting of the cotyledon stage, the abscission stage, and the truncation stage;

performing, by the computing device, recovery operations by entering the determined recovery stage; and in response to the cotyledon stage being the determined recovery stage for the virtual machine:
  aborting, by the computing device, current active transactions in the virtual machine and transactions in a backlog queue of the virtual machine;
  detaching and cleaning, by the computing device, artifacts of the current active transactions and the transactions in the backlog queue;
  unwinding, by the computing device, a thread stack to the cotyledon stage;
  reinitializing, by the computing device, data structures in the virtual machine; and
  restarting, by the computing device, components of the virtual machine including a compiler, a garbage collector, and an event infrastructure.

2. The method according to claim 1, further comprising determining a fault type and a fault source of the fault.

3. The method according to claim 2, wherein the determining the recovery stage is based on the fault type and the fault source.

4. The method according to claim 1, further comprising, in response to determining that the fault has occurred in the virtual machine, generating traces and diagnostics.

5. A computer program product comprising a computer readable storage medium having program instructions embodied therewith, the program instructions executable by a computing device to cause the computing device to:

boot a virtual machine and store a first process state of a cotyledon stage of the virtual machine in response to completing the booting the virtual machine;

initialize components of the virtual machine and store a second process state of an abscission stage of the virtual machine in response to completing the initializing the components of the virtual machine;

prepare to start a transaction in the virtual machine and store a third process state of a truncation stage of the virtual machine in response to the preparing to start the transaction in the virtual machine, wherein the transaction is an instruction executed in the virtual machine;

in response to determining that a fault has occurred in the virtual machine, determine a recovery stage for the virtual machine from the group consisting of the cotyledon stage, the abscission stage, and the truncation stage;

perform recovery operations by entering the determined recovery stage; and in response to the abscission stage being the determined recovery stage for the virtual machine:
- abort current active transactions in the virtual machine;
- detach artifacts of the current active transactions;
- unwind a thread stack to the abscission stage; and
- force a garbage collector of the virtual machine to clean the detached artifacts of the current active transactions.

6. The computer program product according to claim 5, the program instructions further being executable by the computing device to cause the computing device to determine a fault type and a fault source of the fault.

7. The computer program product according to claim 6, wherein the determine the recovery stage is based on the fault type and the fault source.

8. The computer program product according to claim 5, the program instructions further being executable by the computing device to cause the computing device to, in response to determining that the fault has occurred in the virtual machine, generate traces and diagnostics.

9. A system comprising:
- a hardware processor, a computer readable memory, and a computer readable storage medium associated with a computing device;
- program instructions configured to boot a virtual machine and store a first process state of a cotyledon stage of the virtual machine in response to completing the booting the virtual machine;
- program instructions configured to initialize components of the virtual machine and store a second process state of an abscission stage of the virtual machine in response to completing the initializing the components of the virtual machine;
- program instructions configured to prepare to start a transaction in the virtual machine and store a third process state of a truncation stage of the virtual machine in response to the preparing to start the transaction in the virtual machine, wherein the transaction is an instruction executed in the virtual machine;
- program instructions configured to, in response to determining that a fault has occurred in the virtual machine, determine a recovery stage for the virtual machine from the group consisting of the cotyledon stage, the abscission stage, and the truncation stage; and
- program instructions configured to perform recovery operations by entering the determined recovery stage; and in response to the cotyledon stage being the determined recovery stage for the virtual machine:
- abort current active transactions in the virtual machine and transactions in a backlog queue of the virtual machine;
- detach and clean artifacts of the current active transactions and the transactions in the backlog queue;
- unwind a thread stack to the cotyledon stage;
- reinitialize data structures in the virtual machine; and
- restart components of the virtual machine including a compiler, a garbage collector, and an event infrastructure, wherein the program instructions are stored on the computer readable storage medium for execution by the hardware processor via the computer readable memory.

10. The system according to claim 9, further comprising program instructions configured to determine a fault type and a fault source of the fault.

11. The system according to claim 10, wherein the determining the recovery stage is based on the fault type and the fault source.

* * * * *